US010925432B2

(12) United States Patent
Noordhuis (10) Patent No.: US 10,925,432 B2
(45) Date of Patent: Feb. 23, 2021

(54) DEVICE AND METHOD FOR PREPARING A BEVERAGE

(71) Applicant: KONINKLIJKE PHILIPS N.V., Eindhoven (NL)

(72) Inventor: Joeke Noordhuis, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 678 days.

(21) Appl. No.: 15/532,707

(22) PCT Filed: Jan. 7, 2016

(86) PCT No.: PCT/EP2016/050143
§ 371 (c)(1),
(2) Date: Jun. 2, 2017

(87) PCT Pub. No.: WO2016/110516
PCT Pub. Date: Jul. 14, 2016

(65) Prior Publication Data
US 2017/0340162 A1    Nov. 30, 2017

(30) Foreign Application Priority Data
Jan. 7, 2015    (EP) .................................. 15150329

(51) Int. Cl.
*A47J 31/44*    (2006.01)
*A47J 31/46*    (2006.01)

(52) U.S. Cl.
CPC ......... *A47J 31/4496* (2013.01); *A47J 31/469* (2018.08)

(58) Field of Classification Search
CPC .............................. A47J 31/4496; A47J 31/46

USPC ........................................................... 99/294
See application file for complete search history.

(56) References Cited

U.S. PATENT DOCUMENTS

| 6,779,435 B1 * | 8/2004 | Iacobucci ............. A47J 31/005 |
| | | 392/449 |
| 2004/0250686 A1 | 12/2004 | Hale |
| 2010/0178404 A1 * | 7/2010 | Yoakim ............... A47J 31/3628 |
| | | 426/431 |

(Continued)

FOREIGN PATENT DOCUMENTS

| CN | 2547252 Y | 4/2003 |
| CN | 2810438 Y | 8/2006 |

(Continued)

*Primary Examiner* — Dana Ross
*Assistant Examiner* — Joseph W Iskra
(74) *Attorney, Agent, or Firm* — Schott, P.C.

(57) ABSTRACT

A device (1) for preparing a beverage on the basis of interaction between a beverage extract and an extracting fluid, particularly a beverage having a crema layer, comprises a brewing chamber (10) for accommodating a quantity of the beverage extract, having an inlet (11) for receiving the extracting fluid and an outlet (12) for discharging the beverage. Furthermore, the device (1) comprises restricting means (60) which are movable between an activated position for realizing a restriction (61) in the outlet (12) of the brewing chamber (10) and an inactivated position for minimizing the restriction (61) in the outlet (12) of the brewing chamber (10), and also actuator means (70) for controlling the position of the restricting means (60) in relation to an actual state of pumping means (30) as present in the device (1) for realizing a flow of the extracting fluid.

20 Claims, 2 Drawing Sheets

(56) References Cited

U.S. PATENT DOCUMENTS

2011/0189362 A1* 8/2011 Denisart ................. A47J 31/22
426/433
2013/0295244 A1* 11/2013 Reyhanloo .............. A47J 31/36
426/231

FOREIGN PATENT DOCUMENTS

| CN | 201164370 Y | 12/2008 |
|---|---|---|
| CN | 103300727 A | 9/2013 |
| DE | 202006014317 U1 | 2/2008 |
| EP | 0726053 B1 | 8/1996 |
| EP | 1902653 A2 | 3/2008 |
| EP | 2428143 * | 3/2012 |
| EP | 2428143 A1 | 3/2012 |
| GB | 2469874 A | 11/2010 |
| JP | 2002-360435 A | 12/2002 |
| JP | 2002360435 * | 12/2002 |

* cited by examiner

DEVICE AND METHOD FOR PREPARING A BEVERAGE

This application is the U.S. National Phase application under 35 U.S.C. § 371 of International Application No. PCT/EP2016/050143, filed on Jan. 7, 2016, which claims the benefit of International Application No. 15150329.9 filed on Jan. 7, 2015. These applications are hereby incorporated by reference herein.

FIELD OF THE INVENTION

The invention relates to a device for preparing a beverage on the basis of interaction between a beverage extract and an extracting fluid, particularly a beverage having a crema layer, the device comprising a brewing chamber for accommodating a quantity of the beverage extract, having an inlet for receiving the extracting fluid and an outlet for discharging the beverage, pumping means for displacing the extracting fluid from a source of the extracting fluid to the brewing chamber, and for forcing the extracting fluid to flow through the quantity of the beverage extract as may be present in the brewing chamber, and restricting means for realizing a restriction in the outlet of the brewing chamber.

The invention also relates to a method for preparing a beverage on the basis of interaction between a beverage extract and an extracting fluid, particularly a beverage having a crema layer, wherein a quantity of the beverage extract is positioned inside a brewing chamber having an inlet for receiving the extracting fluid and an outlet for discharging the beverage, wherein pumping means are applied for displacing the extracting fluid from a source of the extracting fluid to the brewing chamber, and for forcing the extracting fluid to flow through the quantity of the beverage extract as present in the brewing chamber, and wherein a restriction is realized in the outlet of the brewing chamber.

BACKGROUND OF THE INVENTION

In the field of brewing espresso coffee, the perception of quality is strongly related to the formation of a so-called crema layer, i.e. a thin layer of foam at the top level of the espresso coffee. A requirement in the formation of the crema layer is that the brewing process in which water is forced to flow through a quantity of ground coffee beans in order to obtain the espresso coffee takes place at a sufficiently high pressure. The fact is that the high pressure is needed for dissolving gases like $CO_2$ in the espresso coffee. When the grounds are fine enough, flow resistance is developed to such an extent that the required pressure can actually be realized. However, if the grounds are too coarse, the flow resistance is too low, so that the pressure cannot reach a level associated with the formation of the crema layer. Another problem associated with coarse grounds resides in the fact that the brewing process does not last long enough for the taste of the beverage to be optimal, i.e. a brewing time is too short, because the water passes through the quantity of ground coffee beans too fast.

In the art, the above-sketched problems of the absence of a crema layer and inferior taste in cases of coarse grounds are recognized. Especially in the context of domestic appliances, it cannot be left up to a user to carefully control the grind size. A solution to the problems is found in applying a so-called crema valve, which involves placing a restriction downstream of the brewing chamber, i.e. the chamber where the brewing process takes place during operation. By having such a restriction, it is achieved that the pressure in the brewing chamber is always high enough for creating the crema layer, and that the brewing time is long enough for obtaining good taste. In many practical cases, the restriction is fixed, the crema valve being realized in the form of a spring-loaded valve, as is known from DE 20 2006 014317 U1, for example. According to another known solution, a small orifice plate is applied. An advantage associated with such an orifice plate is that after the brewing process has ended, the pressure prevailing in the brewing chamber will eventually reduce to zero. Contrariwise, when a spring-loaded valve is applied, the pressure will remain at the level of the opening threshold pressure of the valve. On the other hand, a spring-loaded valve can be made adjustable in order to change the process settings, whereas an orifice plate cannot.

According to yet another known solution, a big orifice plate is used, which is almost completely closed by means of a protruding pin. Initially, the small slit between the pin and the plate induces a large restrictive effect. As the pressure inside the brewing chamber increases, the pin is pushed in an outward direction with respect to the chamber until an equilibrium arises, wherein the resulting pressure in the brewing chamber depends on spring force which is used for holding the pin. Measures are taken for preventing the pin from moving back to a less extended position with respect to the brewing chamber. However, each time a new brewing process is started, it is necessary to put the pin back to the initial position for realizing the smallest possible slit between the pin and the plate. To this end, a special resetting mechanism is applied.

The solutions as described in the foregoing have a function in guaranteeing the presence of a crema layer and contributing to good taste under all circumstances, including cases of coarse grounds, so that the user does not need to bother about grind size. However, a number of disadvantages is associated with the known solutions. In the case of a spring-loaded valve, some pressure remains in the brewing chamber, as a result of which the coffee puck remains very wet. This is disadvantageous in view of the fact that the coffee puck disintegrates either in the waste box or while moving to the waste box. In the case of a small orifice plate, the pressure release which takes place after the brewing process has ended is relatively slow. In general, small slits etc. are prone to clogging.

EP 2 428 143 A1 discloses a device for preparing espresso coffee in a coffee machine. Among other things, the coffee machine is equipped with a control unit of the electronic type, which serves for controlling the functions of the machine. Furthermore, the coffee machine has a dispensing outlet for dispensing the coffee, and a valve device for controlling the closing and opening of the dispensing outlet. When a dispensing operation has been started, a shutter which is part of the valve device, and which prevents discharge of coffee, is kept in a state of closing the dispensing outlet for a time whose duration is programmed in the control unit. The control unit actuates an electric valve after that initial time, as a result of which pressurized water is allowed to cause movement of the shutter. All the time during a dispensing operation, pressure needs to be maintained at a level for exerting a force greater than a force exerted by a spring acting to urge an end of the shutter against a valve seat.

SUMMARY OF THE INVENTION

It is an object of the invention to provide a device and a method for preparing a beverage which involve the application of a restriction at a position downstream of the brewing chamber for accommodating a quantity of a beverage extract, and which are different from the known devices and methods as mentioned in the foregoing so as to alleviate disadvantages related to those known devices and methods while allowing for a decrease of costs and an increase of reliability and robustness. According to the invention, a device for preparing a beverage as defined in the opening paragraph is provided, wherein the restricting means are movable between an activated position for realizing a restriction in the outlet of the brewing chamber and an inactivated position for minimizing the restriction in the outlet of the brewing chamber, and wherein the device further comprises actuator means for controlling the position of the restricting means in relation to an actual state of the pumping means, which actuator means are configured and arranged to be operable under the influence of pressure exerted by the pumping means on the fluid in the actual state thereof, being in fluid communication with the pumping means.

It follows from the foregoing that when the invention is applied, the extent to which the outlet of the brewing chamber is restricted is controllable between a minimum extent and a much larger extent. As a result of the relation between the actuator means and the pumping means, the invention offers a possibility of using the pressure exerted by the pumping means on the fluid during operation for putting the restricting means to the activated position in order to restrict the outlet of the brewing chamber to the larger extent. Furthermore, the release of pressure which is realized as soon as the pumping means are put to an inactivated state can be used by the actuator means for putting the restricting means to the inactivated position in order to restrict the outlet of the brewing chamber to the minimum extent.

For the sake of completeness, it is noted that the minimal restriction of the outlet of the brewing chamber should be understood such as to be only a very small restriction, which does not notably influence the pressure in the brewing chamber, or no restriction at all. Furthermore, it is noted that a beverage extract should be understood such as to be any type of material that is suitable to be used as a basic material in a process of preparing a beverage, and that normally has an important function in determining taste and flavor of the beverage, including liquid concentrate of a beverage, fine particles of a solid material such as coffee beans, etc.

The source of the extracting fluid is preferably a water tank or the like, which is suitable for containing a quantity of the fluid, and which may be removably arranged in the device as is well-known in the art. That does not alter the fact that the source of extracting fluid may be the water mains, in which case a tap or valve may be used for enabling fluid communication whenever a supply of extracting fluid is needed in the device, and disabling fluid communication as long as this is not the case.

Advantageously, the device according to the invention comprises blocking means for blocking a flow of fluid between the pumping means and the brewing chamber as long as a pressure exerted by the fluid on the blocking means is below a predetermined threshold pressure, wherein the actuator means are in fluid communication with both the pumping means and the blocking means, at a position between the pumping means and the blocking means. On the basis of the use of the blocking means as mentioned, which may comprise a suitable kind of valve, for example, it is possible to ensure that the restricting means are put to the activated position just before the brewing process starts. When the pumping means are activated, pressure is initially low, as a result of which the blocking means remain in the position for blocking a flow of fluid to the brewing chamber. Yet, as the actuator means are arranged between the pumping means and the blocking means, the actuator means are immediately loaded with the pressure drop over the blocking means, as a result of which the actuator means are capable of putting the restricting means to the activated position, assuming that the pressure is large enough for actually achieving this function of the actuator means. Hence, when the operation of the pumping means is initiated, the restriction in the outlet of the brewing chamber is realized first. As soon as the pressure is larger than the predetermined threshold pressure of the blocking means, the blocking function of the blocking means is removed, and a flow of fluid to the brewing chamber is enabled, so that the brewing process can start. All in all, by applying the blocking means having the predetermined threshold pressure, it is achieved that the pressure which is built up when the pumping means are activated is initially used for realizing the restriction in the outlet of the brewing chamber, wherein the brewing process is started at a somewhat later stage. It will be clear to a person skilled in the art that the predetermined threshold pressure of the blocking means can be chosen such as to ensure that the pressure realized by the pumping means is high enough for putting the restricting means to the activated position by means of the actuator means before the blocking means open the path between the pumping means and the brewing chamber.

In a practical embodiment, the actuator means comprise a hydraulic actuator having a hydraulic chamber which is open at one side and a sealing member for sealing the open side of hydraulic chamber, which sealing member is movable in the hydraulic chamber, in a direction towards the open side of the hydraulic chamber under the influence of pressure exerted by the fluid, and in a direction deeper into the hydraulic chamber under the influence of biasing means. Under the influence of the action of the biasing means, which may comprise a suitable set of springs, for example, a default position of the hydraulic actuator is a position in which the sealing member is at a lowest level in the hydraulic chamber. When pressurized fluid is fed to the hydraulic actuator, the force exerted by the biasing means is counteracted and the sealing member is moved to a higher level as a result thereof. The fact that the sealing member is movable between various levels in the hydraulic chamber is suitable to be used for realizing the different positions of the restricting means as desired, i.e. the position for restricting the outlet of the brewing chamber to such an extent that sufficient pressure can be built up in the brewing chamber for obtaining a crema layer on a beverage to be prepared during operation of the pumping means, and that a sufficiently long brewing time can be realized for obtaining good taste, and the position for minimizing/removing the restriction after the operation of the pumping means has ended. For example, the restricting means may be equipped with a restricting member which is attached to the sealing member of the hydraulic actuator such as to be capable of moving along with the sealing member. Various options of applying such a restricting member for forming a restriction and minimizing/removing a restriction will be elucidated later.

The hydraulic chamber of the hydraulic actuator may be arranged in the device such as to be movable in the same direction as the sealing member, wherein the device may comprise means for displacing the hydraulic chamber and fixing the position of the hydraulic chamber. On the basis of such an arrangement of the hydraulic chamber, the user of the device is offered a possibility of adjusting the brewing pressure, which influences the taste of the beverage to a considerable extent, according to desire. The fact is that the pressure associated with the restriction in the outlet of the brewing chamber is influenced by the position of the hydraulic chamber with respect to the outlet, and that the pressure exerted by the restricting means at the position of the restriction directly influences the pressure prevailing in the brewing chamber.

As mentioned in the foregoing, the restricting means may comprise a restricting member. In particular, according to a first option, the outlet of the brewing chamber comprises a flexible hose, wherein the restricting means comprise a pressing member which is movable between an extended position for pressing a wall portion of the hose inwardly and a retracted position for minimizing the extent to which the pressing member acts on the hose. In that case, the pressing member may be connected to the actuator means through depressible resilient means, so that it is possible to have an elastic nature of the clamping action of the pressing member on the hose. In fact, the use of a flexible hose and a pressing member for pressing a wall portion of the hose inwardly resembles the known use of a flexible hose and a spring-loaded valve, wherein the option according to the invention is different in that the action of the pressing member on the hose is terminated after the pumping means have been put to the inactivated state, so that the disadvantage of having a very wet coffee puck is avoided. In conformity with what is known from the use of a spring-valve as restricting means, it is possible to adjust the process settings, wherein the pressure prevailing in the brewing chamber can be set according to desire within certain practical boundaries.

According to a second option, the restricting means comprise a rod-in-hole combination, wherein the rod has a tapered free end, and wherein the rod is movable between an extended position for partially blocking the hole and a retracted position for minimizing the extent to which the rod blocks the hole. In such a case, the position of the rod is set by means of the actuator means, depending on the action of the pumping means, whereas according to the known use of a rod-in-hole-combination, the position of the rod is set under the influence of pressure prevailing in the brewing chamber.

It is practical for the actuator means to be arranged downstream of the pumping means. In case the device according to the invention comprises blocking means as mentioned earlier, such blocking means may comprise a check valve which is biased towards a closed position, i.e. a position for blocking a flow of fluid. Furthermore, the device may comprise a combination of valves including the check valve, and may further comprise a number of hydraulic lines connected to the combination of valves, wherein a brewing hydraulic line extends between the source of the extracting fluid and the inlet of the brewing chamber, wherein the pumping means and the check valve are arranged at a position on the brewing hydraulic line, and wherein a restricting hydraulic line extending to the actuator means is connected to the brewing hydraulic line, particularly at a position between the pumping means and an inlet side of the check valve. In this practical embodiment of the device according to the invention, the operation of the actuator means is related to the operation of the pumping means as explained earlier, as a result of which it is not only possible to have a restricting function of the restricting means which are controlled by the actuator means, but also to have a non-restricting function, wherein the restricting function is realized prior to the actual start of a brewing process due to the application of the check valve. When compared to known layouts of a device for brewing a beverage and comprising a crema valve, the device according to the invention comprises the restricting hydraulic line and the actuator means arranged at an end of that hydraulic line, i.e. a separate hydraulic line which serves for driving the crema valve.

For the sake of completeness, it is noted that the specific references to the sides of a valve, wherein the sides are denoted as being an inlet side and an outlet side, are chosen in accordance with the direction in which fluid can pass the valve when the valve is in the open position.

The device may comprise a returning hydraulic line extending to the source of the extracting fluid, which is connected to the brewing hydraulic line, particularly at a position between an outlet side of the check valve and the inlet of the brewing chamber, wherein the combination of valves comprises a bypass valve for enabling the restricting hydraulic line to discharge to the returning hydraulic line, wherein the bypass valve is biased towards an open position for allowing a flow of fluid to pass, and wherein a closing threshold pressure of the bypass valve is lower than an opening threshold pressure of the check valve. In this arrangement, the returning hydraulic line is in fact a hydraulic line which is parallel to a portion of the brewing hydraulic line in view of the fact that the returning hydraulic line is also connected to the source of the extracting fluid. Hence, the returning hydraulic line can be used for bypassing the pumping means in a direction opposite to the normal operation direction of the pumping means. Consequently, the presence of the returning hydraulic line offers a possibility of discharging fluid from the actuator means, which contributes to setting the inactivated position of the restricting means after the pumping means have been put to the inactivated state. In order to avoid that much fluid is discharged to the source during operation of the pumping means, a bypass valve is used, having a primary function in allowing fluid to pass at low pressure.

In order to guarantee safe use of the device according to the invention, it is preferred for the combination of valves to comprise a safety valve which is biased towards a closed position, i.e. a position for blocking a flow of fluid, and which is arranged on the returning hydraulic line, wherein an opening threshold pressure of the safety valve is higher than the opening threshold pressure of the check valve. When the pressure rises to an unacceptable high level, which happens when for some reason the beverage cannot be discharged from the brewing chamber, the safety valve opens and allows a flow of fluid from the brewing chamber to the source of fluid through the returning hydraulic line.

As mentioned in the foregoing, the invention does not only provide a device for preparing a beverage on the basis of interaction between a beverage extract and an extracting fluid, particularly a beverage having a crema layer, but also a method. In particular, the method according to the invention comprises the following actions: positioning a quantity of the beverage extract inside a brewing chamber having an inlet for receiving the extracting fluid and an outlet for discharging the beverage, applying pumping means for displacing the extracting fluid from a source of the extracting fluid to the brewing chamber, and for forcing the extracting fluid to flow through the quantity of the beverage extract as present in the brewing chamber, and realizing a restriction in the outlet of the brewing chamber, during operation of the pumping means only, wherein the restriction is minimized when the pumping means have been put to an inactivated state.

In particular, in conformity with what is explained earlier in respect of the device, the method may involve providing and applying restricting means for realizing the restriction in the outlet of the brewing chamber, providing and applying actuator means for controlling a position of the restricting means, supplying pressurized extracting fluid to the actuator means as soon as the pumping means are operated, and allowing fluid to drain from the actuator means back to the source of the extracting fluid, bypassing the pumping means, as soon as the pumping means are put to the inactivated state.

By applying the invention, a crema valve is realized in a device for preparing a beverage such as espresso coffee, so that the formation of the crema layer as desired is guaranteed and good taste can be realized. Different from what is known in the art, the crema valve is only present during operation of the pumping means of the device. The option of adjusting the extent to which the crema valve restricts the outlet of the brewing chamber is maintained, while the disadvantage of obtaining an all too wet coffee puck and the disadvantage of possible clogging are avoided.

The above-described and other aspects of the invention will be apparent from and elucidated with reference to the following detailed description of two embodiments of a device for brewing espresso coffee, comprising a crema valve for guaranteeing the formation of a crema layer on the espresso coffee and for avoiding an all too short brewing time, wherein the influence of the grind size of the material to be extracted on those aspects of a coffee brewing process is minimized.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
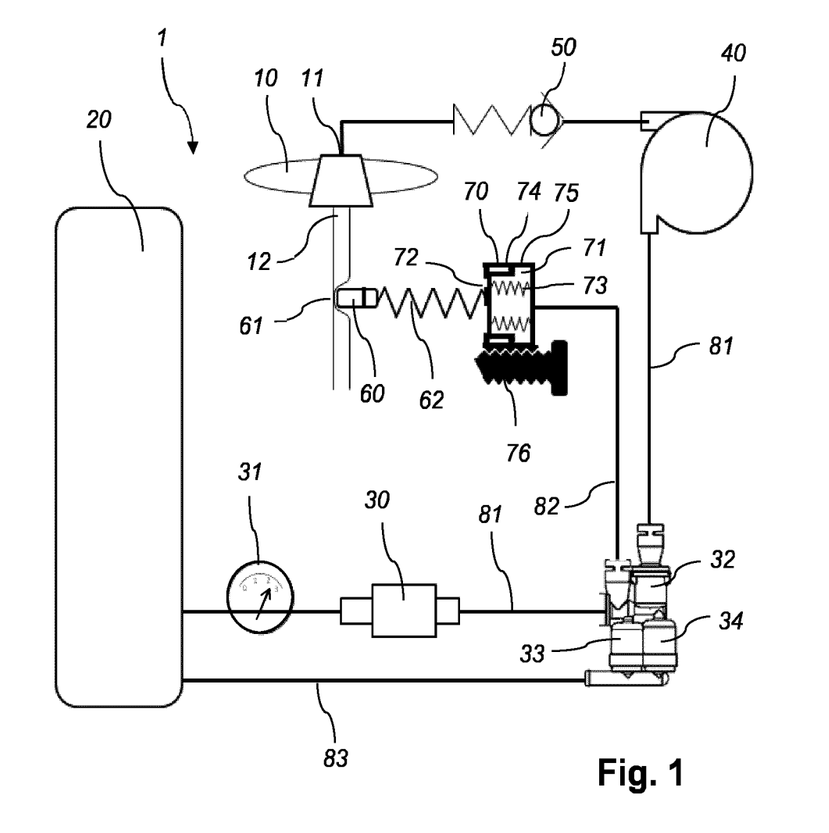
FIG. 1 illustrates the layout of a device according to a first embodiment of the invention, which is suitable to be used for brewing espresso coffee having a crema layer.

FIG. 1 illustrates the layout of a device 1 according to a first embodiment of the invention, which is suitable to be used for brewing espresso coffee having a crema layer, and which will hereafter be referred to as first beverage maker 1. The first beverage maker 1 comprises the following components: a brewing chamber 10, a water tank 20, a pump 30, a thermo block 40, a valve 50, a pressing member 60, a hydraulic actuator 70, a mechanism 76 for setting the brewing pressure, a flow meter 31, and a combination of valves 32, 33, 34. Furthermore, the first beverage maker 1 comprises three hydraulic lines 81, 82, 83 for interconnecting the various components as mentioned. In the following, an elucidation of the design and/or the functioning of the various components is given.

The brewing chamber 10 serves for accommodating a quantity of ground coffee beans. The brewing chamber 10 may be designed such that a user of the first beverage maker 1 is capable of opening and closing the brewing chamber according to desire, especially for the purpose of inserting a quantity of ground coffee beans. On the other hand, it is possible for the first beverage maker 1 to be equipped with special means for supplying coffee grind to the brewing chamber 10, in which case it is practical if such means are adapted to be closed to the brewing chamber 10 during brewing. The brewing chamber 10 has an inlet 11 for receiving fluid to be used in the brewing process, which is assumed to be water in the remainder of this description relating to the figures. Furthermore, the brewing chamber 10 has an outlet 12 for discharging the espresso coffee. In the shown example, the outlet 12 comprises a flexible hose extending from the brewing chamber 10 in a direction which is a downward direction in the normal operational orientation of the first beverage maker 1.

The water tank 20 serves for containing water to be supplied to the brewing chamber 10 for the purpose of extracting ground coffee beans as may be present in the brewing chamber 10.

The pump 30 serves for displacing the water from the water tank 20 to the brewing chamber 10, and for forcing the water to flow through the ground coffee beans as may be present in the brewing chamber 10. Within the framework of the invention, any suitable type of pump may be applied.

The thermo block 40 serves for heating the water which is supplied to the brewing chamber 10 under the influence of the pump 30. For the sake of completeness, it is noted that within the framework of the invention, other suitable types of components for heating the water may be used in the first beverage maker 1 as well.

The valve 50 is arranged between the thermo block 40 and the brewing chamber 10, and primarily serves for letting the water pass in the direction from the thermo block 40 towards the brewing chamber 10 under normal circumstances.

Figure 2A:
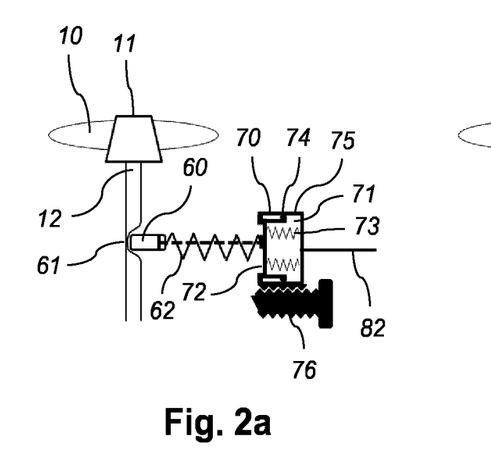
FIGS. 2a and 2b illustrate two different positions of components of the device shown in FIG. 1, namely a hydraulic actuator and a pressing member connected to the hydraulic actuator.
Figure 2B:
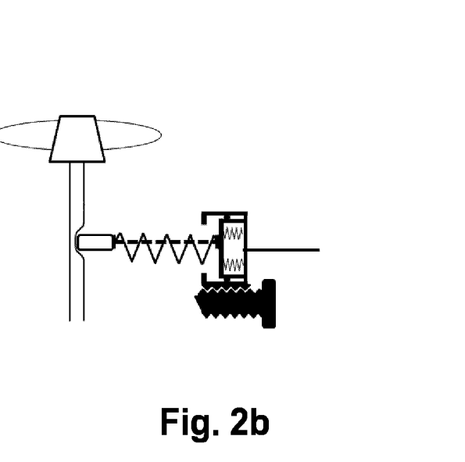

The pressing member 60 is movable between an extended position for restricting the outlet 12 of the brewing chamber 10 by acting on the outlet 12 and a retracted position for having no notable restriction in the outlet 12. FIGS. 2a and 2b show the two different positions of the pressing member 60, wherein FIG. 2a applies to the extended position and FIG. 2b applies to the retracted position, and wherein the restriction is indicated by reference numeral 61.

The hydraulic actuator 70 is connected to the pressing member 60 for setting the positions of the pressing member 60. Within the framework of the invention, the hydraulic actuator 70 may be of any type which is suitable for moving the pressing member 60 between two positions. In the shown example, the hydraulic actuator 70 comprises a hydraulic chamber 71 which is open at one side, a sealing member 72 which can be positioned at different levels of the chamber 71, depending on fluid pressure prevailing in the hydraulic chamber 71, and springs 73 for biasing the sealing member 72 in a direction deeper into the hydraulic chamber 71. Suitable ring-shaped means 74 may be used for avoiding leakage of fluid between the wall 75 of the chamber 71 and the sealing member 72. Furthermore, in the shown example, a mechanism 76 for setting and fixing the position of the hydraulic chamber 71 is present. This mechanism 76 is operable by the user of the first beverage maker 1 for influencing the taste of the espresso coffee according to desire by adjusting the brewing pressure. The fact is that when the hydraulic chamber 71 is positioned closer to the outlet 12 of the brewing chamber 10, the pressing member 60 is made to restrict the outlet 12 at a higher pressure than when the hydraulic chamber 71 is positioned further away from the outlet 12.

The flow meter 31 is used in a process of controlling the quantity of the espresso coffee to be emitted by the first beverage maker 1 during a brewing process, which quantity may be adapted to the size of a receptacle such as a cup for receiving the espresso coffee. In the shown example, the flow meter 31 is arranged between the water tank 20 and the pump 30.

Figure 3:
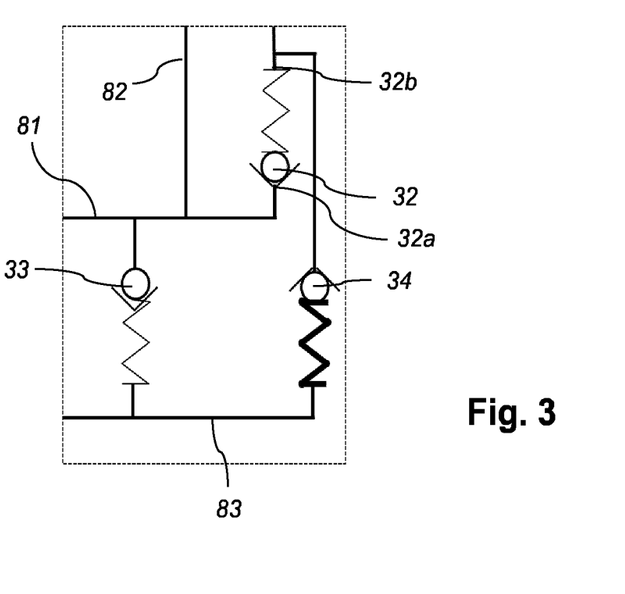
FIG. 3 is a diagrammatic representation of a combination of valves which is part of the device shown in FIG. 1.

With reference to FIG. 3, it is noted that the combination of valves 32, 33, 34 comprises three valves 32, 33, 34, namely a check valve 32, a bypass valve 33 and a safety valve 34. The functioning of these valves 32, 33, 34 will be explained later.

In the following, the layout of the first beverage maker 1 will be further described by mentioning the particulars of the various hydraulic lines 81, 82, 83. A brewing hydraulic line 81 extends from the water tank 20 to the inlet 11 of the brewing chamber 10. In the direction from the water tank 20 to the brewing chamber 10, the flow meter 31, the pump 30, the check valve 32, the thermo block 40 and the valve 50 are successively arranged on the brewing hydraulic line 81. A restricting hydraulic line 82 extends from a position on the brewing hydraulic line 82, particularly a position between the pump 30 and an inlet side 32a of the check valve 32, to the hydraulic actuator 70. A returning hydraulic line 83 extends from the water tank 20 to a position on the brewing hydraulic line 81, particularly a position between an outlet side 32b of the check valve 32 and the inlet 11 of the brewing chamber 10. The bypass valve 33 is arranged such as to allow the restricting hydraulic line 82 to discharge to the returning hydraulic line 83, wherein it is noted that the direction of a possible flow through the bypass valve 33 is a direction towards the water tank 20. Furthermore, the safety valve 34 is arranged on the returning hydraulic line 83.

The check valve 32 is biased towards a closed position, i.e. a position for blocking a flow of fluid. For example, the opening threshold pressure of the check valve 32 may be about 2 bar. When the user decides to have espresso coffee, what needs to be done is ensuring that an appropriate quantity of coffee grind is placed on the brewing chamber 10, that the water tank 20 contains a sufficient quantity of water, and that the mechanism 76 for adjusting the brewing pressure is set correctly, and initiating a brewing process, which involves activating the pump 30. In a first instance, the pressure as built up in the fluid under the influence of the pump 30 is relatively low, so that the check valve 32 remains closed. In the process, at least the pressure drop over the check valve 32 causes a pressure to act on the hydraulic actuator 70. As a result, the hydraulic actuator 70 causes the pressing member 60 to move to the extended position as shown in FIGS. 1 and 2a. At that point, a restriction 61 is realized in the outlet 12 of the brewing chamber 10, which helps in reaching a brewing pressure which is sufficiently high for obtaining a crema layer, and a brewing time which is sufficiently long for realizing good taste.

In a second instance, the pressure in the fluid reaches the level of the opening threshold pressure of the check valve 32, as a result of which the check valve 32 opens. At that moment, the fluid is no longer only pressurized in the restricting hydraulic line 82, but in the brewing hydraulic line 81 as well. As a result, water is made to flow through the thermo block 40 and the valve 50, into the brewing chamber 10, so that the actual brewing process can take place. In the process, the pressure in the brewing chamber 10 rises while the outlet 12 of the brewing chamber 10 is kept practically closed by means of the pressing member 60, wherein an equilibrium between the pressure drop over the restriction 61 and the pressure exerted by the pressing member 60 on the hose under the influence of the hydraulic actuator 70 is realized. In this respect, it is noted that the pressing member 60 is connected to the hydraulic actuator 70 through depressible resilient means which may comprise a suitable spring 62. For the sake of illustration, a default length of the spring 62 is indicated by means of a dashed line in FIGS. 1, 2a and 2b at the position of the spring 62. When the pump 30 is put to the inactivated state, the fluid pressure drops, the check valve 32 closes so that the brewing hydraulic line 81 is interrupted, and the bypass valve 33 opens so that fluid can be discharged from the hydraulic chamber 71 of the hydraulic actuator 70 to the water tank 20. As a result, the pressing member 60 is retracted, and the espresso coffee is allowed to discharge from the brewing chamber 10 through the outlet 12. As the restriction 61 of the outlet 12 of the brewing chamber 10 is practically removed when the pressing member is in the retracted position, there is no situation of remaining pressure and a very wet coffee puck. In respect of the bypass valve 33, it is noted that this valve 33 is biased towards an opened position, wherein the closing threshold pressure is relatively low, for example, only about 1 bar.

The safety valve 34 is biased towards a closed position, wherein an opening threshold pressure of the safety valve 34 is relatively high, for example, about 20 bar. When, for some reason, for example when the restriction 61 of the outlet 12 of the brewing chamber 10 is not removed due to hampering of the combination of the pressing member 60 and the hydraulic actuator 70, the pressure in the brewing chamber 10 and the associated brewing hydraulic line 81 rises to a level which is high enough for opening the safety valve 34, the pressure is released on the basis of a discharge of fluid to the water tank 10 through the returning hydraulic line 83. Advantageously, a mechanism is provided for interrupting the brewing process when absence of flow is detected by means of the flow meter 31.

Figure 4:
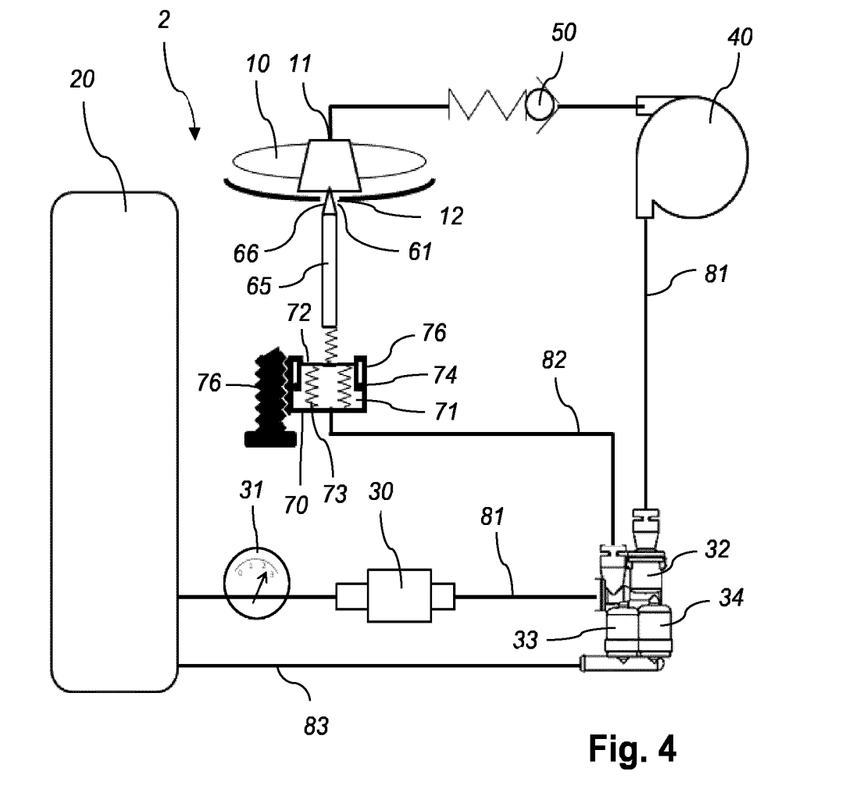
FIG. 4 illustrates the layout of a device according to a second embodiment of the invention, which, like the device shown in FIG. 1, is suitable to be used for brewing espresso coffee having a crema layer.

FIG. 4 illustrates the layout of a device 2 according to a second embodiment of the invention, which, like the first beverage maker 1, is suitable to be used for brewing espresso coffee having a crema layer, and which will hereafter be referred to as second beverage maker 2. The second beverage maker 2 resembles the first beverage maker 1 to a large extent. A notable difference between the beverage makers 1, 2 is found in the facts that in the second beverage maker 2, the outlet 12 of the brewing chamber 10 does not comprise a flexible hose, and there is no pressing member 60. Instead, the outlet 12 is made as a hole in the brewing chamber 10, wherein a rod 65 having a tapered free end 66 which is situated at the level of the outlet 12 is provided. Due to the tapered shape of the free end 66, the outlet 12 is restricted to a larger extent when the rod 65 is moved to a more extended position, and the restriction 61 of the outlet 12 is reduced when the rod 65 is moved to a more retracted position. Apart from these aspects of the second beverage maker 2, the layout of the second beverage maker 2 corresponds to the layout of the first beverage maker 1. Hence, the second beverage maker 2 is operated in a similar manner as the first beverage maker 1, wherein the extent to which the outlet 12 of the brewing chamber 10 is restricted is determined by means of the movably arranged rod 65 having the tapered free end 66. As already explained in respect of the first beverage maker 1, the restriction 61 is created right before the start of an actual brewing process due to the application of the check valve 32, and the restriction 61 is minimized or even completely removed after the pump 30 has been put to the inactivated state, wherein fluid is discharged from the hydraulic actuator 70 to the water tank 20 through the bypass valve 33.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

The invention claimed is:

1. A device for preparing a beverage on the basis of interaction between a beverage extract and an extracting fluid, particularly a beverage having a crema layer, the device comprising:
    a brewing chamber for accommodating a quantity of the beverage extract, having an inlet for receiving the extracting fluid and an outlet for discharging the beverage,
    pumping means for displacing the extracting fluid from a source of the extracting fluid to the brewing chamber, and for forcing the extracting fluid to flow through the quantity of the beverage extract as present in the brewing chamber,
    restricting means which are movable between an activated position for realizing a restriction in the outlet of the brewing chamber and an inactivated position for minimizing the restriction in the outlet of the brewing chamber, and
    actuator means for controlling the position of the restricting means based on an actual state of the pumping means, which actuator means are configured and arranged to be operable under the influence of pressure exerted by the pumping means on the extracting fluid in the actual state thereof, being in fluid communication with the pumping means and particularly being configured and arranged to put the restricting means to the activated position when the pumping means are operated, and to put the restricting means to the inactivated position when the pumping means are put to an inactivated state,
    wherein the outlet of the brewing chamber is configured to discharge the beverage when the pumping means are put to the inactivated state.

2. The device according to claim 1, further comprising blocking means for blocking a flow of fluid between the pumping means and the brewing chamber as long as a pressure exerted by the extracting fluid on the blocking means is below a predetermined threshold pressure, wherein the actuator means are in fluid communication with both the pumping means and the blocking means, at a position between the pumping means and the blocking means.

3. The device according to claim 1, wherein the actuator means comprise a hydraulic actuator having a hydraulic chamber which is open at one side and a sealing member for sealing the open side of the hydraulic chamber, which sealing member is movable in the hydraulic chamber, in a direction towards the open side of the hydraulic chamber under the influence of pressure exerted by the extracting fluid, and in a direction deeper into the hydraulic chamber under the influence of a biasing means.

4. The device according to claim 3, wherein the hydraulic chamber of the hydraulic actuator is movable in the same direction as the sealing member, and wherein the device further comprises means for displacing the hydraulic chamber and fixing a position of the hydraulic chamber.

5. The device according to claim 1, wherein the outlet of the brewing chamber comprises a flexible hose, and wherein the restricting means comprise a pressing member which is movable between an extended position for pressing a wall portion of the flexible hose inwardly and a retracted position for minimizing an extent to which the pressing member acts on the flexible hose.

6. The device according to claim 5, wherein the pressing member is connected to the actuator means through a depressible resilient means.

7. The device according to claim 1, wherein the restricting means comprise a rod-in-hole combination, wherein the rod of the rod-in-hole combination has a tapered free end, and wherein the rod is movable between an extended position for partially blocking the hole of the rod-in-hole combination and a retracted position for minimizing an extent to which the rod blocks the hole.

8. The device according to claim 1, wherein the actuator means are arranged downstream of the pumping means.

9. The device according to claim 2, wherein the blocking means comprise a check valve which is biased towards a closed position for blocking a flow of fluid.

10. The device according to claim 9, comprising a combination of valves including the check valve, and further comprising a number of hydraulic lines connected to the combination of valves, wherein a brewing hydraulic line extends between the source of the extracting fluid and the inlet of the brewing chamber, wherein the pumping means and the check valve are arranged at a position on the brewing hydraulic line, and wherein a restricting hydraulic line extending to the actuator means is connected to the brewing hydraulic line, particularly at a position between the pumping means and an inlet side of the check valve.

11. The device according to claim 10, wherein a returning hydraulic line extending to the source of the extracting fluid is connected to the brewing hydraulic line, particularly at a position between an outlet side of the check valve and the inlet of the brewing chamber, wherein the combination of valves comprises a bypass valve for enabling the restricting hydraulic line to discharge to the returning hydraulic line, wherein the bypass valve is biased towards an open position for allowing a flow of fluid to pass, and wherein a closing threshold pressure of the bypass valve is lower than an opening threshold pressure of the check valve.

12. The device according to claim 11, wherein the combination of valves comprises a safety valve which is biased towards a closed position for blocking a flow of fluid, and which is arranged on the returning hydraulic line, and wherein an opening threshold pressure of the safety valve is higher than the opening threshold pressure of the check valve.

13. A method for preparing a beverage on the basis of interaction between a beverage extract and an extracting fluid, particularly a beverage having a crema layer, wherein a quantity of the beverage extract is positioned inside a brewing chamber having an inlet for receiving the extracting fluid and an outlet for discharging the beverage, wherein pumping means are applied for displacing the extracting fluid from a source of the extracting fluid to the brewing chamber, and for forcing the extracting fluid to flow through the quantity of the beverage extract as present in the brewing chamber, wherein a restriction is realized in the outlet of the brewing chamber, during operation of the pumping means only, the restriction being minimized after the pumping means have been put to an inactivated state, and wherein the beverage is discharged from the outlet of the brewing chamber when the pumping means are put to the inactivated state.

14. The method according to claim 13, wherein restricting means are provided and applied for realizing the restriction in the outlet of the brewing chamber, wherein actuator means are provided and applied for controlling a position of the restricting means, wherein pressurized extracting fluid is supplied to the actuator means as soon as the pumping means are operated, and wherein fluid is allowed to drain from the actuator means back to the source of the extracting fluid, bypassing the pumping means, as soon as the pumping means are put to the inactivated state.

15. A device for preparing a beverage on the basis of interaction between a beverage extract and an extracting fluid, particularly a beverage having a crema layer, the device comprising:
   a brewing chamber for accommodating a quantity of the beverage extract, having an inlet for receiving the extracting fluid and an outlet for discharging the beverage,
   pumping means for displacing the extracting fluid from a source of the extracting fluid to the brewing chamber, and for forcing the extracting fluid to flow through the quantity of the beverage extract as present in the brewing chamber, and
   restricting means for realizing a restriction in the outlet of the brewing chamber during operation of the pumping means only, and for minimizing the restriction when the pumping means have been put to an inactivated state.

16. The device according to claim 15, further comprising:
   actuator means for controlling a position of the restricting means, and
   a combination of valves including a bypass valve,
   wherein the pumping means further supplies pressurized extracting fluid to the actuator means as soon as the pumping means are operated, and
   wherein the bypass valve allows fluid to drain from the actuator means back to the source of the extracting fluid, bypassing the pumping means, as soon as the pumping means are put to the inactivated state.

17. The device according to claim 16, further comprising blocking means for blocking a flow of fluid between the pumping means and the brewing chamber as long as a pressure exerted by the extracting fluid on the blocking means is below a predetermined threshold pressure, wherein the actuator means are in fluid communication with both the pumping means and the blocking means, at a position between the pumping means and the blocking means.

18. The device according to claim 16, wherein the actuator means comprise a hydraulic actuator having a hydraulic chamber which is open at one side and a sealing member for sealing the open side of the hydraulic chamber, which sealing member is movable in the hydraulic chamber, in a direction towards the open side of the hydraulic chamber under the influence of pressure exerted by the extracting fluid, and in a direction deeper into the hydraulic chamber under the influence of a biasing means.

19. The device according to claim 15, further comprising a thermo block for heating the extracting fluid which is supplied to the brewing chamber under the influence of the pumping means.

20. The device according to claim 19, further comprising a valve arranged between the thermo block and the brewing chamber and configured for letting the extracting fluid pass in a direction from the thermo block towards the brewing chamber.

\* \* \* \* \*